United States Patent
Jornod et al.

(10) Patent No.: US 11,332,142 B2
(45) Date of Patent: May 17, 2022

(54) METHOD, COMPUTER PROGRAM, APPARATUS, TRANSPORTATION VEHICLE, AND NETWORK COMPONENT FOR CONTROLLING A MANEUVER WITHIN A PLATOON

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE); Ahmad El Assaad, Wolfsburg (DE)

(73) Assignee: Volkswagen Aktiengesellschaft

( * ) Notice: Subject to any disclaimer, the term of this patent is extended or adjusted under 35 U.S.C. 154(b) by 166 days.

(21) Appl. No.: 16/852,754

(22) Filed: Apr. 20, 2020

(65) Prior Publication Data
US 2020/0339127 A1      Oct. 29, 2020

(30) Foreign Application Priority Data

Apr. 24, 2019   (EP) .................................. 19170887

(51) Int. Cl.
*B60W 30/18* (2012.01)
*H04W 4/42* (2018.01)
(Continued)

(52) U.S. Cl.
CPC ...... *B60W 30/18163* (2013.01); *B60W 30/16* (2013.01); *B60W 50/00* (2013.01);
(Continued)

(58) Field of Classification Search
CPC .......... B60W 30/18163; B60W 30/16; B60W 50/00; B60W 2556/65; H04W 4/42; G01C 21/3469; G08G 1/22
See application file for complete search history.

(56) References Cited

U.S. PATENT DOCUMENTS 8,676,466 B2    3/2014  Mudalige
9,147,353 B1 *  9/2015  Slusar .................. G08G 1/0129
(Continued)

FOREIGN PATENT DOCUMENTS

CN    101859494 A    10/2010
CN    108010307 A     5/2018
(Continued)

OTHER PUBLICATIONS

Hammerschmidt; Fraunhofer brings QoS to V2X communications; eeNews Automotive, Sep. 7, 2018.
(Continued)

*Primary Examiner* — Peter D Nolan
*Assistant Examiner* — Wae L Louie
(74) *Attorney, Agent, or Firm* — Barnes & Thornburg, LLP

(57) ABSTRACT

A method, a computer program, an apparatus, a transportation vehicle, and a network component for controlling a maneuver within a platoon of transportation vehicles. The method for controlling a maneuver within a platoon of transportation vehicles includes receiving information related to a maneuver for the platoon, determining a reference point for the maneuver within the platoon based on one or more maneuver criteria, and providing information related to the reference point within the platoon.

23 Claims, 5 Drawing Sheets

(51) Int. Cl.
  *B60W 30/16* (2020.01)
  *B60W 50/00* (2006.01)
  *G01C 21/34* (2006.01)
  *G08G 1/00* (2006.01)
  *H04W 52/26* (2009.01)

(52) U.S. Cl.
  CPC .......... *G01C 21/3469* (2013.01); *G08G 1/22* (2013.01); *H04W 4/42* (2018.02); *H04W 52/265* (2013.01); *B60W 2050/0075* (2013.01); *B60W 2554/802* (2020.02); *B60W 2556/65* (2020.02)

(56) References Cited

U.S. PATENT DOCUMENTS

| | | | |
|---|---|---|---|
| 9,182,764 B1* | 11/2015 | Koi | B60W 30/00 |
| 9,355,423 B1* | 5/2016 | Slusar | G08G 1/0112 |
| 9,940,840 B1* | 4/2018 | Schubert | G01C 21/3407 |
| 10,096,067 B1* | 10/2018 | Slusar | G06Q 40/08 |
| 10,459,454 B2 | 10/2019 | Saxena et al. | |
| 10,922,979 B2 | 2/2021 | Reimann et al. | |
| 2010/0256835 A1 | 10/2010 | Mudalige | |
| 2010/0256836 A1 | 10/2010 | Mudalige | |
| 2011/0184596 A1* | 7/2011 | Andreasson | G08G 1/22 701/19 |
| 2013/0041567 A1* | 2/2013 | Yamashiro | B60W 30/16 701/96 |
| 2013/0041576 A1* | 2/2013 | Switkes | G01C 22/00 701/123 |
| 2014/0316671 A1* | 10/2014 | Okamoto | G08G 1/22 701/96 |
| 2014/0316865 A1 | 10/2014 | Okamoto | |
| 2017/0212527 A1 | 7/2017 | Park | |
| 2017/0344023 A1* | 11/2017 | Laubinger | B60W 30/165 |
| 2018/0225975 A1 | 9/2018 | Park | |
| 2018/0279096 A1* | 9/2018 | Wu | H04W 4/08 |
| 2019/0147745 A1* | 5/2019 | Kim | G05D 1/0295 701/301 |
| 2019/0163205 A1* | 5/2019 | Kodera | G05D 1/0295 |
| 2019/0171227 A1* | 6/2019 | Sujan | G07C 5/008 |
| 2021/0337431 A1* | 10/2021 | Pfadler | H04W 28/24 |

FOREIGN PATENT DOCUMENTS

| | | |
|---|---|---|
| CN | 109109838 A | 1/2019 |
| KR | 20170076645 A | 7/2017 |
| KR | 20170128187 A | 11/2017 |
| WO | 2017210200 A1 | 12/2017 |

OTHER PUBLICATIONS

Tokekar et al.; Energy-Optimal Trajectory Planning for Car-Like Robots; Autonomous Robots; 2014; vol. 37, No. 3; pp. 279-300.

Zhou et al.; Vehicle Platoon Control in High-Latency Wireless Communications Environment; Transportation Research Record; Journal of the Transportation Research Board; No. 2324; Transportation Research Board of the National Academies; Washington, DC; 2012; pp. 81-90.

3GPP; 3rd Generation Partnership Project; Service and System Aspects (SA); Working Group 2 (WG2); liaison statement of the 5th-Generation Automotive Association (5GAA); May 28-Jun. 1, 2018; Newport Beach, California.

Office Action for Korean Patent Application No. 10-2020-0048748; dated Mar. 24, 2021.

Office Action for Chinese Patent Application No. 202010331296.0; dated Dec. 17, 2021.

* cited by examiner

METHOD, COMPUTER PROGRAM, APPARATUS, TRANSPORTATION VEHICLE, AND NETWORK COMPONENT FOR CONTROLLING A MANEUVER WITHIN A PLATOON

PRIORITY CLAIM

This patent application claims priority to European Patent Application No. 19170887.4, filed 24 Apr. 2019, the disclosure of which is incorporated herein by reference in its entirety.

SUMMARY

Illustrative embodiments relate to a method, a computer program, an apparatus, a transportation vehicle, and a network component for controlling a maneuver within a platoon of a plurality of transportation vehicles, more specifically, but not exclusively, to determining a reference point for a platoon maneuver within a platoon.

BRIEF DESCRIPTION OF THE DRAWINGS

Disclosed embodiments will be described using the following non-limiting exemplary embodiments of apparatuses or methods or computer programs or computer program products by way of example only, and with reference to the accompanying figures, in which.

DETAILED DESCRIPTION

Figure 1:
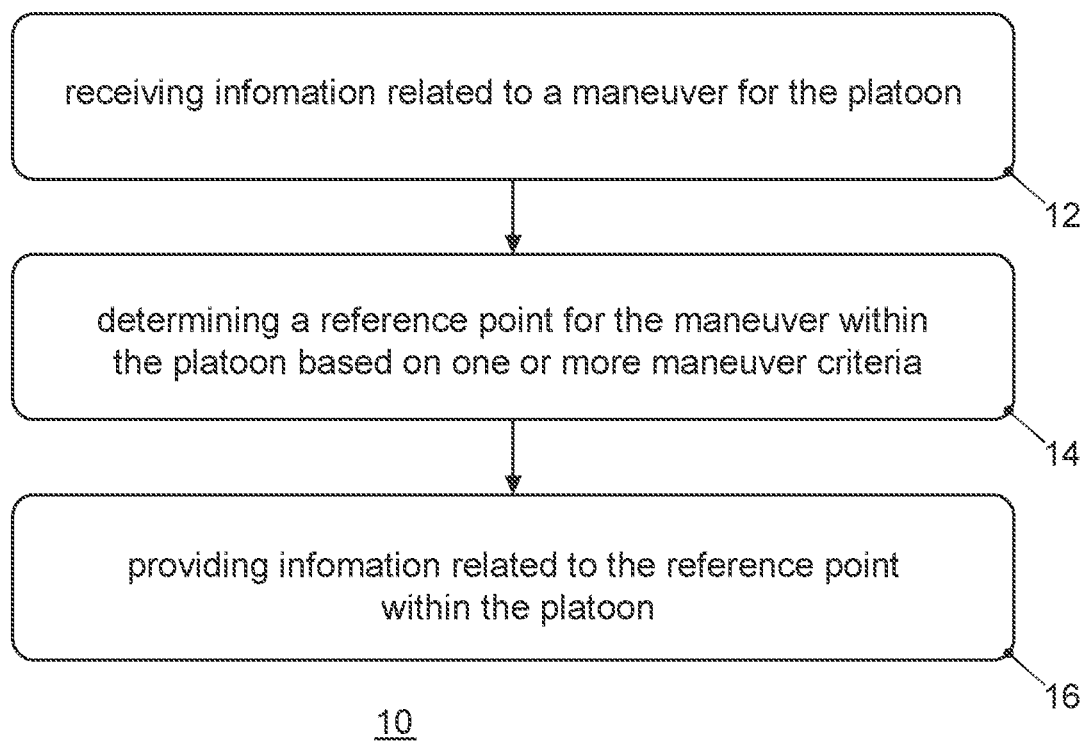
FIG. 1 illustrates a block diagram of an exemplary embodiment of a method for controlling a maneuver within a platoon.

Vehicular communication is a field of research and development. To enable an autonomous or semi-autonomous driving of the transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Automated or autonomous driving is also a field of research and development. One concept of dealing with high traffic loads is platooning, in which transportation vehicles are grouped and which may allow making more efficient use of the road capacity, lowering fuel consumption, respectively. The groups of transportation vehicles, also referred to as convoys or platoons, may be used to operate the transportation vehicles in the platoon with a short distance or headway between the transportation vehicles, as the transportation vehicles within the platoon may react within a short time delay or simultaneously. This can be achieved by control mechanisms being active between the transportation vehicles of the platoon.

In the scope of the Agile Quality of Service Adaptation (AQoSA) concept for High Density Platooning (HDPL), transportation vehicles reduce their Inter Vehicle Distance (IVD) to reduce their fuel consumption. They can achieve this distance reduction thanks to good communication conditions, about which they may have been made aware in advance (Predictive Quality of Service, PQoS). However, when the QoS degrades, the IVD has to be increased again.

Pratap Tokekar, Nikhil Karnad, and Volkan Isler, "Energy-optimal trajectory planning for car-like robots.", Autonomous Robots 37, no. 3 (2014): 279-300, consider that when a battery-powered robot needs to operate for a long period of time, optimizing its energy consumption becomes critical.

Hao Zhou, Romesh Saigal, Francois Dion, and Li Yang, "Vehicle Platoon Control in High-Latency Wireless Communications Environment", Transportation Research Record: Journal of the Transportation Research Board, No. 2324, Transportation Research Board of the National Academies, Washington, D.C., 2012, pp. 81-90, disclose recent developments in transportation vehicle onboard computers and vehicle-to-vehicle communications technology that allow automatic control of transportation vehicles and the organization of transportation vehicles into platoons with short intra-platoon distances.

S2-184727 of the 3rd Generation Partnership Project, Service and System Aspects (SA), Working Group 2 (WG2) is a liaison statement of the 5th-Generation Automotive Association (5GAA) laying out details on PQoS requirements from the perspective of 5GAA.

Christoph Hammerschmidt, "Fraunhofer brings QoS monitoring to V2X communications", eeNews Automotive, Sep. 7, 2018, describes that reliable communications between transportation vehicles are a basic prerequisite for automated and connected driving. Research institute Fraunhofer ESK has developed a new approach to keep the quality of the radio connection at a high level. It even can predict the behavior of the transmission in the near future and take appropriate transportation vehicle action.

Document US 2014/0316865 A1 describes a platoon travel system, which organizes and performs a platoon travel of plural transportation vehicles along a preset travel route. The system has a grouping unit that divides the plural transportation vehicles into a top group and a tail end group based on projection area information of the transportation vehicles, and groups transportation vehicles with a projection area in a first range to the top group and transportation vehicles with a projection area in a second range to the tail end group, which is less than the first range. A final position determination unit determines a position of each of the plural transportation vehicles in the transportation vehicle groups based on the depart point information, positions the top group transportation vehicles in an ascending order of depart point distances, and positions the tail end group transportation vehicles in a descending order of depart point distances, thereby preventing deterioration of the whole platoon energy consumption.

There is a demand for an improved concept for controlling platoon maneuvers.

Disclosed embodiments are based on the finding that with a naive approach of having each truck responsible for the reduction of the distance in front of it, a maneuver system of a platoon is not scalable as the farther from the front truck, the more expensive the maneuver. Additionally, the duration of an overall maneuver increases drastically with the number of trucks in a platoon. As a result, the prediction horizon needed for AQoSA is higher. It is a finding that a tradeoff between the reduction of the maneuvering time and fuel efficiency can be found by using a different reference points in a platoon for the maneuver. For example, if a maneuver aims at a reduction of the IVD, maneuver time may be saved by choosing a transportation vehicle in the middle of the platoon as reference point such that transportation vehicles behind the reference point accelerate and transportation vehicles in front of the reference point decelerate. Disclosed embodiments may be enablers for the AQoSA concept for HDPL, which aims for fuel efficiency.

Disclosed embodiments provide a method for controlling a maneuver within a platoon of a plurality of transportation vehicles. The method comprises receiving information related to a maneuver for the platoon and determining a reference point for the maneuver within the platoon based on one or more maneuver criteria. The method further comprises providing information related to the reference point within the platoon. By varying a reference point for a maneuver within a platoon of transportation vehicles different parameters or criteria can be improved or even optimized. For example, disclosed embodiments enable a flexibility with respect to maneuver time and/or fuel consumption.

In disclosed embodiments, the one or more maneuver criteria may comprise one or more elements of the group of a fuel consumption of the transportation vehicles of the platoon without the maneuver, a fuel consumption of the transportation vehicles of the platoon for the maneuver, a fuel consumption of the transportation vehicles of the platoon after the maneuver, a time consumption of the transportation vehicles of the platoon for the maneuver, an estimated time till the next maneuver, and a time consumption of the transportation vehicles of the platoon for a reverse maneuver. Disclosed embodiments may consider different criteria or a combination of different criteria for maneuver efficiency or improvement.

For example, the maneuver may be an increase or a decrease of an inter vehicle distance within the platoon. Disclosed embodiments may enable an improved control for different maneuvers of a platoon. Depending on the circumstances, different reference points may be applied for a maneuver in disclosed embodiments.

In some disclosed embodiments, the method may comprise receiving information related to a predicted quality of service, PQoS, of communication links between the transportation vehicles of the platoon. Disclosed embodiments may enable a consideration of the PQoS for maneuver planning and control. For example, the PQoS may define a duration during which a reduced IVD may be used. Disclosed embodiments may therewith consider a fuel savings after the maneuver and additional fuel consumption for the maneuver, a reverse maneuver, respectively. Based on the PQoS time line, the maneuver itself may be adapted with respect to its reference point and an agility or pace of the maneuver.

The method may further comprise determining an economic efficiency of the maneuver. Disclosed embodiments may enable a higher economic efficiency for maneuvers in a platoon.

For example, the maneuver is a decrease of an IVD between the transportation vehicles of the platoon. The determining of the economic efficiency may then comprise evaluating a fuel consumption for the maneuver, a fuel consumption after the maneuver, and a fuel consumption for reversing the maneuver, wherein the fuel consumption after the maneuver is evaluated based on an estimated duration before reversing the maneuver. The fuel consumption/savings after the maneuver may be evaluated based on an estimated duration before a reverse maneuver needs to be carried, which may be based on the PQoS. It is a finding that a time horizon of QoS may dictate the time frame for the maneuvers. Disclosed embodiments may hence estimate an overall fuel efficiency of the maneuver, the benefit of the maneuver for an estimated time duration, and a reverse maneuver.

Disclosed embodiments may hence consider an overall maneuver fuel balance, e.g., additional fuel consumption for decreasing the IVD, fuel savings during operation with reduced IVD, and additional fuel consumption for increasing the IVD back to normal. The maneuver may be a decrease of the IVD. The method may comprise receiving information related to PQoS, and the method may predict, based on the information related to the PQoS, a duration of a decreased IVD until the IVD has to be increased (reverse maneuver) again. The method may then comprise determining the reference point based on the fuel consumption for decreasing the IVD, based on maneuvering duration requirements, and based on the fuel consumption for the predicted duration of decreased IVD within the platoon.

Disclosed embodiments may evaluate an overall fuel consumption of the transportation vehicles of the platoon for the maneuver, between the maneuver and a reverse maneuver, and for a reverse maneuver. The method may further comprise rejecting the maneuver if the overall fuel consumption is higher with the maneuver than without the maneuver. Disclosed embodiments may prevent inefficient maneuvers.

The method may further comprise determining a maneuver duration. Information related to the maneuver duration may be provided together with the information related to the reference point. Disclosed embodiments may further increase an overall efficiency by influencing the maneuver duration.

For example, the method may comprise determining a control parameter for the maneuver. The control parameter may indicate or set a pace or an agility/aggressiveness at which the maneuver is carried out. Information related to the control parameter may be provided together with the information related to the reference point. Disclosed embodiments may enable to communicate the maneuver characteristics together with the reference point to the platoon. Additionally or alternatively, information related to the control parameter may be provided together with information related to a subsequent control strategy comprising kinematic information. Disclosed embodiments may also provide individual maneuver settings such as braking or acceleration levels/strengths (kinematic information) for the transportation vehicles.

In some disclosed embodiments, the method comprises communicating information related to the reference point, the maneuver duration, and/or the control parameter to one or more transportation vehicles of the platoon. Disclosed embodiments may enable external control of the maneuver. Other disclosed embodiments may enable internal control within the platoon.

Disclosed embodiments further provide an apparatus for controlling a maneuver within a platoon of a plurality of transportation vehicles. The apparatus comprises one or more interfaces for communicating with one or more transportation vehicles of a platoon of a plurality of transportation vehicles. The apparatus further comprises a control module configured to carry out one or more of the methods described herein. Other disclosed embodiments are a transportation vehicle comprising the apparatus and a network component comprising the apparatus.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Within the concept of Agile Quality of Service Adaptation (AQoSA), the application supported by a communications system may adapt its settings to the foreseen Quality of Service (QoS). It is especially important when the application in question is a safety-related time-critical application such as High-Density Platooning (HDPL), where Inter Vehicle Distances (IVDs) are short, for example, below 20 m, 15 m, 10 m, 5 m. At this IVD, due to very short detection and reaction times available, sensor systems need to be supported by information transmitted by other transportation vehicles.

The quality of the communication link is therefore critical as the performance of the application is strongly dependent on it. To cope with variations on the QoS, AQoSA provides an information on the future quality of the link. This information comes with a prediction horizon, that is the delta time in the future for which the predicted value is applicable. The prediction horizon may come with a cost. For instance, the network in a cellular communication system may make a customer pay for this information as it may come with guarantee (guaranteed QoS for the prediction horizon). Disclosed embodiments may take the time horizon into account and at least some disclosed embodiments may also take the cost of a network guaranteed QoS into account, e.g., such cost may be evaluated against potential fuel savings.

Finally, one of the main problems identified in platooning is that all trucks need to accelerate to create the platoon as well as to reconnect after an interruption of the link (that is a drop in the QoS), thus consuming more fuel.

With classical decentralized Cooperative Adaptive Cruise Control (CACC), each truck/car is responsible to choose and to keep the IVD to the preceding transportation vehicle. After receiving the predictive QoS (PQoS) profile (or calculating it based on received information), each transportation vehicle may compute the benefit of performing HDPL (i.e., reducing the distance between each transportation vehicles) for some maneuver duration, depending on the PQoS profile. For example, there are 10 trucks in a platoon, originally driving at IVD=30 m. Each truck receives the PQoS profile and determines that the QoS will be good enough for a long enough time to perform HDPL with IVD=5 m.

The problem here is that the computation is valid for each pair of transportation vehicles only. For the whole group, the maneuver effort should be computed with the first truck as reference. For the second truck, the IVD error to compensate will indeed be 25 m, however, it will be 50 m for the third and 9*25 m=225 m for the tenth. The presented fuel efficiency computation is therefore not scalable to more than two trucks. More important, the received PQoS profile is not applicable to the following trucks as the maneuver is longer; indeed, trucks in the back have to speed up longer. Compared to the second transportation vehicle, the last one will have a maneuver time close to N−1 times longer to catch up (assuming similar acceleration profiles). This delay increases the time of the entire maneuver if the maneuver is considered complete when all target IVDs are reached, hence longer PQoS horizons are required.

FIG. 1 illustrates a block diagram of an exemplary embodiment of a method 10 for controlling a maneuver within a platoon of a plurality of transportation vehicles. The method comprises receiving 12 information related to a maneuver for the platoon and determining 14 a reference point for the maneuver within the platoon based on one or more maneuver criteria. The method 10 further comprises providing information related to the reference point within the platoon. By determining the reference point, disclosed embodiments may influence the maneuver duration, energy efficiency, fuel consumption, etc.

Figure 2:
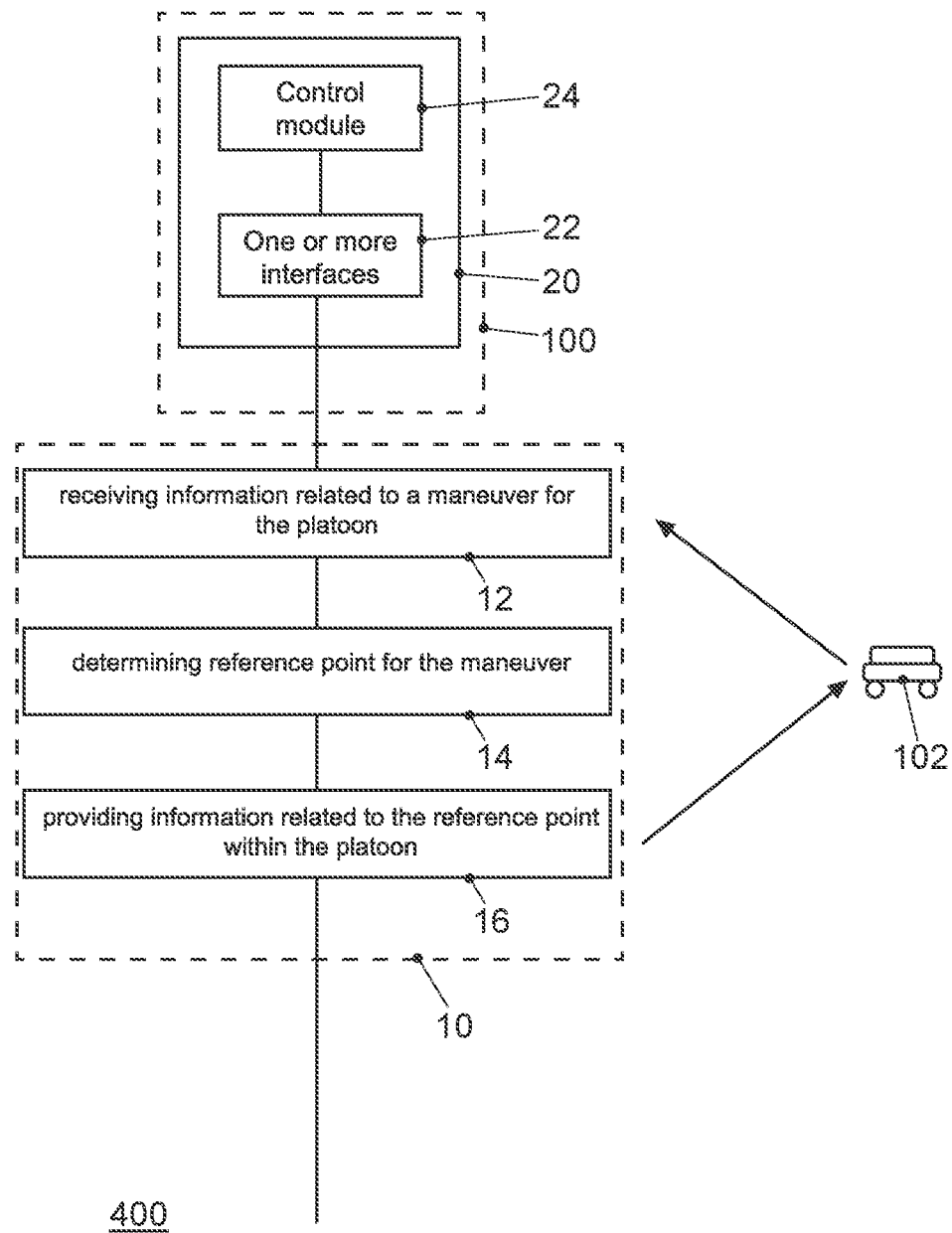
FIG. 2 illustrates a block diagram of an exemplary embodiment of an apparatus for controlling a maneuver within a platoon, and an exemplary embodiment of a transportation vehicle.

FIG. 2 illustrates a block diagram of an exemplary embodiment of an apparatus 20 for controlling a maneuver within a platoon. The apparatus 10 comprises at least one (one or more) interface 12 for communicating with one or more transportation vehicles of a platoon of a plurality of transportation vehicles. The apparatus comprises a control module 14, which is coupled to the at least one interface 12. The control module 14 may be configured to control the one or more interfaces 12 and to execute any of the methods described herein. FIG. 2 further illustrates an exemplary embodiment of a transportation vehicle/network component 100 comprising an exemplary embodiment of the apparatus 20.

The apparatus 20, transportation vehicle 100 and the network component 100 may communicate through a mobile communication system 400. The mobile communication system 400, as shown in FIG. 2, may, for example, correspond to one of the Third Generation Partnership Project (3GPP)-standardized mobile communication networks, where the term mobile communication system is used synonymously to mobile communication network. The information related to the maneuver may hence be received through the mobile communication system 400, e.g., from another transportation vehicle 102 as indicated in FIG. 2. In other disclosed embodiments, the request may be received from a central entity (network component), which controls the transportation vehicles 100, 102 at least to a certain extent. Likewise, the information related to the reference point may be provided to a transportation vehicle 102 or a network component.

The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/transportation vehicles. A base station transceiver can be operable or configured to communicate with one or more active mobile transceivers/transportation vehicles 100 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 100, 102 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatus 20 may be comprised in a base station, a NodeB, a UE, a relay station, or any service coordinating network entity in disclosed embodiments. It is to be noted that the term network component may comprise multiple sub-components, such as a base station, a server, etc. A further disclosed embodiment is a transportation vehicle 100 comprising the apparatus 20 and/or a network component comprising the apparatus 20.

In disclosed embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information related to capabilities, application requirements, trigger indications, requests, message interface configurations, feedback, information related to control commands, QoS requirements, QoS maps, etc.

As shown in FIG. 2 the respective one or more interfaces 22 are coupled to the respective control module 24 at the apparatuses 20. In disclosed embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

FIG. 2 also shows an exemplary embodiment of a system 400 comprising disclosed embodiments of UE/transportation vehicle/network component 100, and another transportation vehicle 102, it may as well comprise one or more network components/base stations comprising further disclosed embodiments of the apparatus 20. In disclosed embodiments, communication, i.e., transmission, reception or both, may take place among mobile transceivers/transportation vehicles 100, 102 directly and/or between mobile transceivers/transportation vehicles 100, 102 and a network component (infrastructure or mobile transceiver, e.g., a base station, a network server, a backend server, etc.). Such communication may make use of a mobile communication system 400. Such communication may be carried out directly, e.g., by Device-to-Device (D2D) communication, which may also comprise Vehicle-to-Vehicle (V2V) or car-to-car communication in case of transportation vehicles 100, 102. Such communication may be carried out using the specifications of a mobile communication system 400.

In disclosed embodiments, the one or more interfaces 22 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

As further illustrated in FIG. 2, the method 10 may be carried out at the apparatus 20 in the transportation vehicle 100. The transportation vehicle 100 may receive information related to a maneuver for the platoon, e.g., from another transportation vehicle 102, from a controlling network component, from a platoon determining control entity, etc. The transportation vehicle or network component 100 may then determine a reference point for the maneuver within the platoon based on one or more maneuver criteria and provide information related to the reference point within the platoon to the other transportation vehicle 102.

Figure 3A:
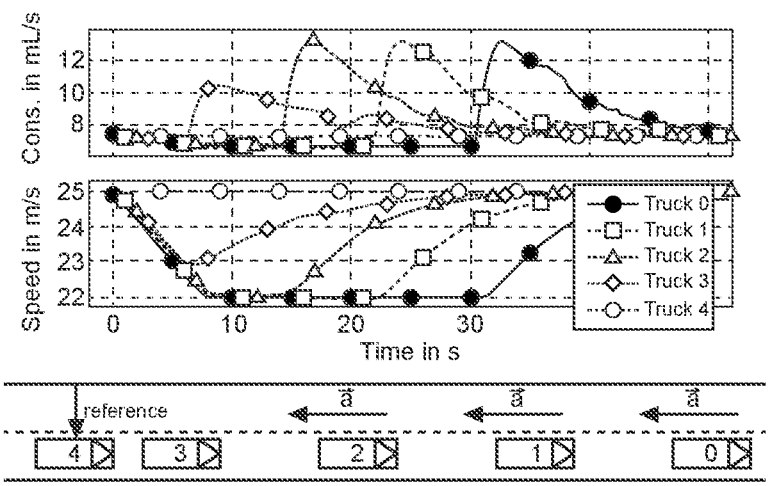
FIG. 3a illustrates a reference point determination in an exemplary embodiment with fuel consumption as an objective.
Figure 3B:
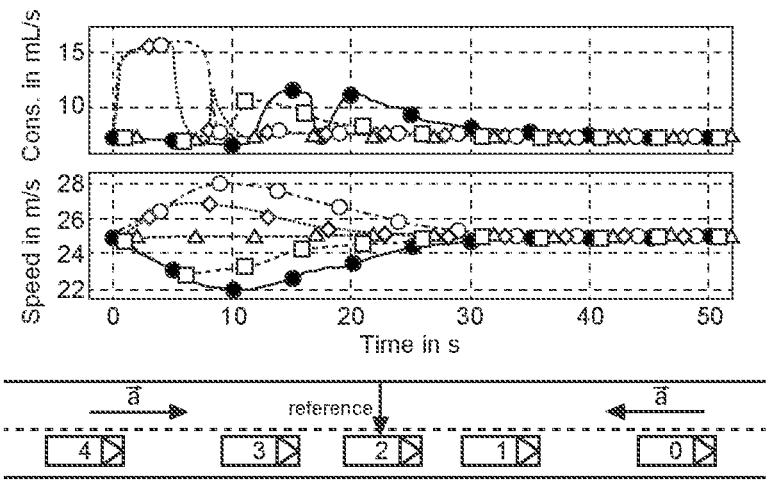
FIG. 3b illustrates a reference point determination in an exemplary embodiment with time optimization as an objective.
Figure 3C:
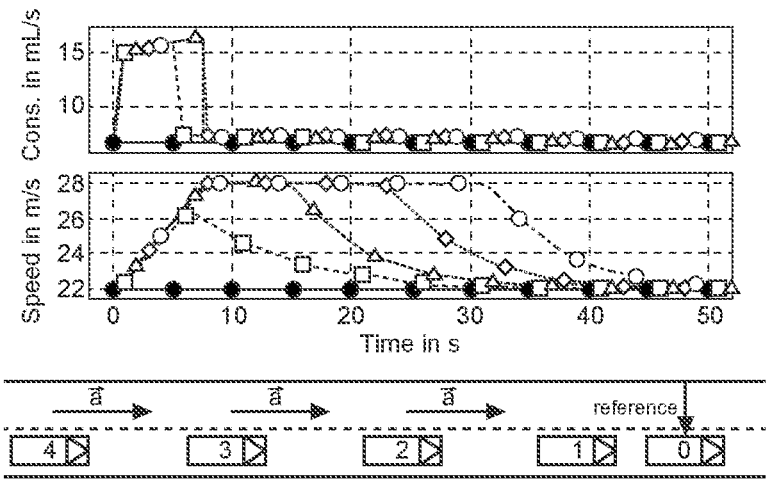
FIG. 3c shows a maneuver approach for gap reduction or platoon creation using the leading transportation vehicle as reference point.

FIGS. 3a, 3b, and 3c illustrate different reference points in disclosed embodiments. FIG. 3a shows a reference point determination in an exemplary embodiment with fuel consumption as objective, FIG. 3b illustrates a reference point determination in an exemplary embodiment with time optimization as objective, and FIG. 3c shows a maneuver approach for gap reduction or platoon creation using the leading transportation vehicle as reference point.

Each of the FIGS. 3a, 3b, and 3c shows at the bottom shows five transportation vehicles/trucks 0, 1, 2, 3, 4 moving in sequence from left to right. At the top FIGS. 3a, 3b, and 3c each depicts a chart showing the fuel consumption of the transportation vehicles in mL/s versus time in s, and in the center each of the Figs. shows the speed of the transportation vehicles in m/s over time in s. Truck 0 uses a circular marker, truck 1 uses a square marker, truck 2 uses a triangular marker, truck 3 uses a diamond marker and truck 4 uses a pentagon marker.

FIG. 3 shows reference point placement for (a) fuel consumption optimization with the reference point in the back of the platoon, (b) maneuver duration optimization with the reference point at the center of the platoon, both of which can be compared to the (c) classical reference point in the front of the platoon. FIG. 3 illustrates an IVD reduction/decrease maneuver (gap closing maneuver). The horizontal arrows represent the direction of the accelerations applied. The direction of driving is from left to right and the fuel consumption values are instantaneous consumption that are not considering drag force.

Disclosed embodiments may change the reference point and adapt the parameters of the maneuver depending on one or more maneuver criteria. For example, the one or more maneuver criteria comprise one or more elements of the group of a fuel consumption of the transportation vehicles of the platoon without the maneuver, a fuel consumption of the transportation vehicles of the platoon for the maneuver, a fuel consumption of the transportation vehicles of the platoon after the maneuver, a time consumption of the transportation vehicles of the platoon for the maneuver, an estimated time till the next maneuver, and a time consumption of the transportation vehicles of the platoon for a reverse maneuver. In the following disclosed embodiments, two objectives, the time of the maneuver (maneuver duration), and fuel consumption will be used as examples. As maneuver examples, an increase or a decrease of the IVD within the platoon are used.

The method 10 may comprise receiving information related to a predicted quality of service, PQoS, of communication links between the transportation vehicles of the platoon. Indeed, when considering the PQoS profile, the time of the maneuver may play an important role as it may determine the prediction horizon. While a very fast maneuver is indeed possible (full brake or full acceleration, for instance), this defeats the purpose of the other objective, fuel efficiency. Disclosed embodiments may find an appropriate balance.

Figure 4:
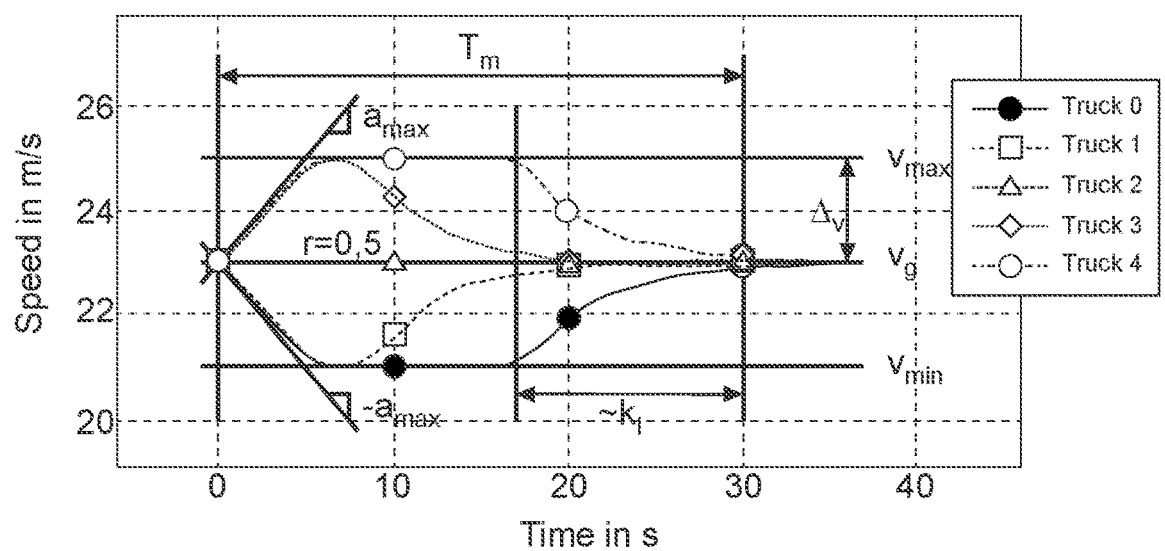
FIG. 4 illustrates parameters that are used to adapt a control strategy in an exemplary embodiment.

The concept of moving the reference point is depicted using FIGS. 3a, 3b, and 3c, with the vertical arrow depicting the reference point. The following is also given in a moving reference frame centered to the reference point and moving at the target velocity for the platoon. Further parameters that can be adapted are depicted in FIG. 4.

FIG. 3a shows the situation if the reference point is placed at the last truck 4. All other trucks 0, 1, 2, 3 decelerate to decrease the IVD and accelerate to restore the platoon average speed of 25 m/s, which is to be achieved once the target IVD is reached. In FIG. 3a at the top the fuel consumption of the trucks is decreased during the respective deceleration phase (speed is lowered, gap is starting to close) and increased to restore the average speed with the decreased IVD (when target gap size is reached). The overall maneuver time is approximately 45 s, which is the duration until truck 0 has restored the platoon speed with decreased IVD. Since fuel consumption is dependent on the absolute speed, accelerating from a speed below the platoon average speed to the platoon average speed consumes less fuel than accelerating above the platoon average speed as required in the next two disclosed embodiments. In this disclosed embodiment, minimization of the fuel consumption without drag force consideration may be the objective. In general, an exemplary embodiment of the method 10 may comprise determining an economic efficiency of the maneuver, for example, in terms of fuel consumption.

Here, the solution is to move the reference point to the last truck, as reducing the speed of all trucks to reach the target point is the solution in which the least fuel is consumed. FIG. 3a illustrates a reference point determination in an exemplary embodiment with fuel consumption as objective without drag force consideration. Here the maneuvering time (maneuver duration app. 45 s) is the same as the normal CACC (depicted in FIG. 3c) but as there is more deceleration involved as acceleration, the fuel consumption is reduced. In disclosed embodiments, the maneuver may be a decrease of an inter vehicle distance between the transportation vehicles of the platoon. The determining of the economic efficiency may comprise evaluating a fuel consumption for the maneuver and fuel savings after the maneuver. The fuel savings after the maneuver may be evaluated based on an estimated duration before a reverse maneuver. In other words, a fuel consumption for the maneuver, a fuel consumption after the maneuver, and a fuel consumption for reversing the maneuver may be evaluated in some disclosed embodiments. The fuel consumption after the maneuver may evaluated based on an estimated duration before reversing the maneuver. For reversing the maneuver another reference point may be determined.

FIG. 3b shows a reference point determination in an exemplary embodiment with time optimization as objective. The objective of minimizing the maneuver time may be carried out at the cost of fuel efficiency. This solution may be chosen, when the cost of the PQoS is higher than the corresponding fuel consumption. FIG. 3b shows similar illustrations as FIG. 3a. In FIG. 3b the reference point was moved to transportation vehicle 2, which keeps its speed constant at the platoon's average speed of 25 m/s. Accordingly, transportation vehicles 0 and 1 decelerate below 25 m/s and transportation vehicles 3 and 4 accelerate above 25 m/s. As can be seen the maneuver is completed after approximately 25 s, which is half of the time needed in the disclosed embodiment of FIG. 3a. However, the overall fuel consumption is higher in the scenario of FIG. 3b compared to that of FIG. 3a. Accelerating above the platoon's average speed is more fuel consuming as shown at the top of FIG. 3b. In this disclosed embodiment, the maneuver duration is reduced or even minimized.

FIG. 3c illustrates the scenario with the reference point at the truck 0 in very front of the platoon. The speed of the reference transportation vehicle 0 stays constant at 25 m/s. All other transportation vehicles accelerate at t=0 to 28 m/s and close the gaps in between. As explained above, the times of staying at the higher speed is different for the other transportation vehicles as the last transportation vehicle must compensate for all other gap reductions in front. Therefore, the time to complete the maneuver is 45 s in the present example and the fuel consumption is higher compared to FIGS. 3a and 3b.

FIG. 4 illustrates parameters that can be used to adapt a control strategy in an exemplary embodiment. FIG. 4 shows a chart depicting speed in m/s versus time in s using the same style as FIGS. 3a to 3c. Besides the reference point, other parameters can be adapted in disclosed embodiments. FIG. 4 summarizes at least some of them. Parameters can be used to adapt the control strategy to the balance found between rapidity of the maneuver and fuel efficiency. In FIG. 4 r is the reference point and r=0.5 is the middle of the platoon. amax is the maximum absolute acceleration (which is also assumed to be valid for deceleration with negative sign), Δv is the maximum speed increase/decrease compared to vg the target speed of the platoon.

v+Δv=vmax, v−Δv=vmin, being maximum and minimum speed of the platoon. kl is a control gain that dictates the "aggressiveness", "rapidity", or "agility" of the controller and influences the time needed to accelerate or decelerate to vg as shown in FIG. 4. Tm depicts the resulting time of the complete maneuver. Decreasing the Δv reduces the required acceleration (and thus the fuel consumption) but increases the maneuvering time Tm. The same is true for the maximal acceleration amax and the control gain kl.

Figure 5:
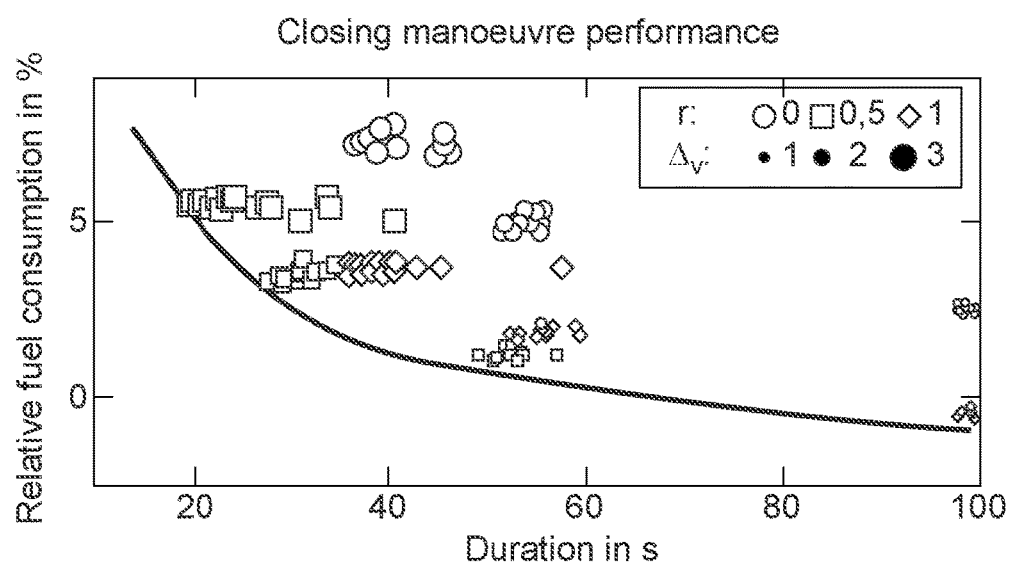
FIG. 5 shows a chart depicting relative fuel consumption versus maneuver duration for IVD decrease.
Figure 6:
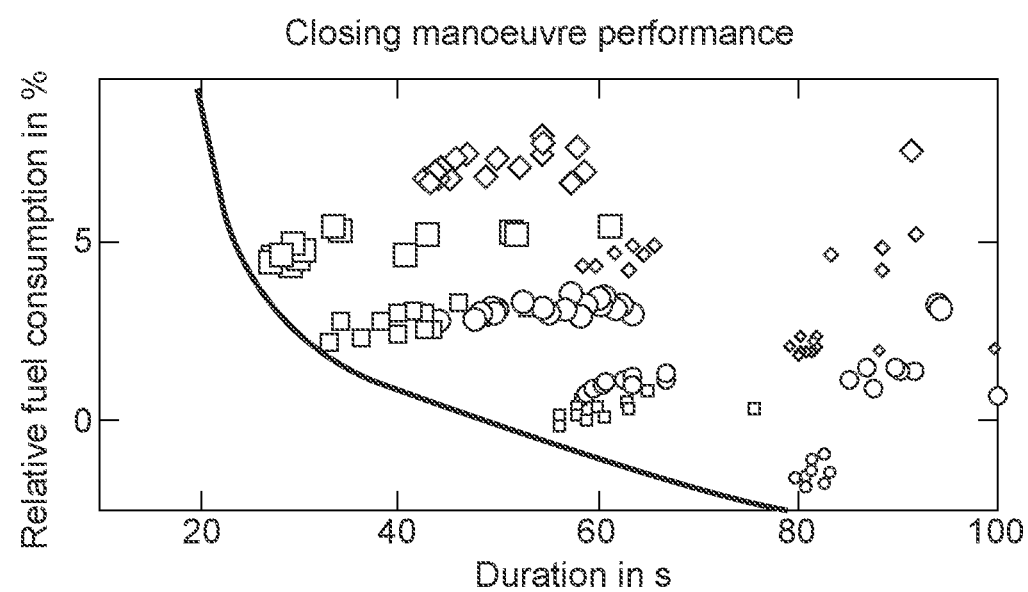
FIG. 6 shows a chart depicting relative fuel consumption versus maneuver duration for an IVD increase.

A comparison of the three algorithms (reference point in the front, the back, or in the middle of the platoon) for two different maneuvers (IVD increase/IVD decrease) is given in the following FIGS. 5 and 6. FIG. 5 shows a chart depicting relative fuel consumption in % versus maneuver duration in a for IVD decrease (closing maneuver performance). FIG. 6 shows a chart depicting relative fuel consumption in % versus maneuver duration in s for an IVD increase (opening maneuver performance).

Each of the charts shows a performance evaluation without drag force correction of closing the gap (FIG. 5) and opening the gap maneuvers (FIG. 6) for different parameter combinations. Different markers depict the different versions of the CACC algorithm: Bullets stand for the classical front reference (FIG. 3c, r=0), squares for the center reference (FIG. 3b, r=0.5) optimized for time, and diamonds for the back reference (FIG. 3a, r=1), r∈{0,0.5,1}, respectively. The size of the markers is proportional to the maximal speed deviation $\Delta v \in \{1,2,3\}$ m/s. The lower $\Delta v$ the lower the additional fuel consumption and the longer the maneuver time.

Disclosed embodiments may further determine a control parameter/gain kl for the maneuver. For example, the control parameter/gain indicates or sets a pace/rapidity/agility at which the maneuver is carried out. The information related to the control parameter may be provided together with the information related to the reference point. The information related to the control parameter may be provided together with information related to a subsequent control strategy comprising kinematic information. Such kinematic information may comprise maneuver settings for the individual transportation vehicles, e.g., individual braking/acceleration profiles.

In some disclosed embodiments, a minimization of the fuel consumption with drag force consideration may be carried out.

Disclosed embodiments may use the concept of moving the reference point for the maneuver and may additionally introduce an optimization or improvement of the fuel consumption to find the final/optimized reference point for the maneuver. Disclosed embodiments may achieve a fuel efficiency with lower IVDs in line with AQoSA. Consequently, some disclosed embodiments may vary the reference point position in the platoon and a pace of the individual maneuvers by setting maneuver durations or control gain.

In some disclosed embodiments, the objective (criteria) may be reduced to the acceleration profile and the duration of the maneuver, as acceleration is the derivative of the velocity. In the addressed scenario, in addition to the traditional models for energy consumption that account for the mass of the transportation vehicle, their shape and resistance to air drag, disclosed embodiments may also account for the distances to preceding transportation vehicles and hence consider the benefit of HDPL. In doing so, disclosed embodiments may determine or compute both the energy consumed during the maneuver and the time to perform the maneuver. In such an exemplary embodiment, the method 10 further comprises determining a maneuver duration, and information related to the maneuver duration is provided together with the information related to the reference point.

For example, the maneuver is a decrease of an IVD between the transportation vehicles of the platoon. The method 10 comprises receiving information related to PQoS, and predicting, based on the information related to the PQoS, a duration of a decreased IVD until the inter vehicle distance has to be increased again. The reference point is determined based the fuel consumption for decreasing the IVD, based on maneuvering duration requirements, and based on the fuel consumption for the predicted duration of decreased IVD within the platoon. Hence, an overall fuel consumption of the transportation vehicles of the platoon for the maneuver itself, between the maneuver and a reverse maneuver, and for a reverse maneuver may be evaluated.

This can be optimized in some disclosed embodiments as follows: Disclosed embodiments may find the reference point that minimizes/optimizes/improves the sum of the consumed energy for the optimal acceleration profile for this reference point.

Once the optimal consumption and time of maneuver is computed, the maneuver can be assessed against the available PQoS profile, which would also need to have a prediction horizon greater than the maneuver time plus the HDPL time that will compensate the maneuver effort.

The following operations are therefore performed in a further disclosed embodiment:

1. Receive the PQoS profile (this information may be received from a cellular network);
2. Find the reference point for the maneuver using the presented method 10;
3. Save the time required to achieve the effective IVD reduction from the previous operation;
4. Compare the fuel consumption during the maneuver and the achievable fuel economy of HDPL for the provided prediction profile (the method 10 may reject the maneuver if the overall fuel consumption is higher with the maneuver than without the maneuver);
5. Verify that the solution found is the same for each platoon member if the method is executed in a distributed state, via a signaling that includes the sharing of the choice of reference point and the computed global energy consumption results and a series of acknowledgements. The method may comprise communicating information related to reference point and the maneuver to one or more transportation vehicles of the platoon;
6. Take the decision whether to undergo the maneuver under the computed decision; and
7. Compute feedback to finetune the model with the results of the undergone maneuver.

In disclosed embodiments, instead of constantly having the trucks adapting to the first truck, the reference point may be made dependent on the environmental conditions, the cost/prediction horizon of the predictive QoS, and the fuel reduction objective.

The signaling may be implemented in a centralized of in a distributed state. For example, a transportation vehicle within the platoon may carry out the method 10 and inform/coordinate the platoon members. In other disclosed embodiments, the method 10 may be carried out at a control center in an infrastructure network component and the results may be communicated to the members of the platoon, or a coordinating member of the platoon. In further disclosed embodiments, a fully distributed implementation is conceivable in which the method 10 is carried out at least partly at each of the platoon members. As lined out above, then an additional coordination or reconcilement communication may be carried out among the members of the platoon to assure corporate maneuvering.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and exemplary embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

0 Truck
1 Truck
2 Truck
3 Truck
4 Truck
10 Method for controlling a maneuver within a platoon of a plurality of transportation vehicles
12 receiving information related to a maneuver for the platoon
14 determining a reference point for the maneuver within the platoon based on one or more maneuver criteria
16 providing information related to the reference point within the platoon
20 apparatus for controlling a maneuver within a platoon of a plurality of transportation vehicles
22 one or more interfaces
24 control module
50 CACC optimized for IVD decrease
60 CACC enhanced
70 CACC optimized for IVD increase
100 transportation vehicle/network component
102 transportation vehicle
400 mobile communication system

The invention claimed is:

1. An apparatus for controlling a maneuver within a platoon of a plurality of transportation vehicles, the apparatus comprising:
  one or more interfaces for communicating with one or more transportation vehicles of the platoon of the plurality of transportation vehicles; and
  a control module configured to control the maneuver within the platoon of the plurality of transportation vehicles, by controlling the one or more interfaces to receive information related to a maneuver for the platoon, wherein the maneuver includes increasing or decreasing an inter-vehicular distance between one or more transportation vehicles of the platoon such that, upon the maneuver being completed, the inter-vehicular distance between the transportation vehicles of the platoon is a same predefined inter-vehicular distance, wherein the control module is configured to:
    select a plurality of reference point transportation vehicles from among the plurality of transportation vehicles,
    for each one of the plurality of reference point transportation vehicles, determine corresponding values of one or more criteria parameters for achieving the same predefined inter-vehicular distance by maneuvering at least one of the plurality of transportation vehicles within the platoon with respect to the one of the plurality of reference point transportation vehicles,
    identify an optimized reference point transportation vehicle based on the corresponding values, and
    provide information to at least one transportation vehicle of the plurality of transportation vehicles indicating the identified optimized reference point transportation vehicle.

2. A non-transitory computer readable storage medium having a program code for performing the functionality of the control module as specified in claim 1, when the program code is executed on a computer, a processor, or a programmable hardware component.

3. A transportation vehicle comprising the apparatus of claim 1.

4. A network component comprising the apparatus of claim 1.

5. The apparatus of claim 1, wherein the one or more maneuver criteria comprise one or more elements of the group of a fuel consumption of the transportation vehicles of the platoon without the maneuver, a fuel consumption of the transportation vehicles of the platoon for the maneuver, a fuel consumption of the transportation vehicles of the platoon after the maneuver, a time consumption of the transportation vehicles of the platoon for the maneuver, an estimated time till the next maneuver, and a time consumption of the transportation vehicles of the platoon for a reverse maneuver.

6. The apparatus of claim 1, wherein information related to a predicted quality of service (PQoS) of communication links between the transportation vehicles of the platoon is received by the apparatus.

7. The apparatus of claim 1, wherein the control module is further configured to determine an economic efficiency of the maneuver.

8. The apparatus of claim 7, wherein the maneuver is a decrease of an inter-vehicle distance between the transportation vehicles of the platoon, wherein the determining of the economic efficiency includes evaluating a fuel consumption for the maneuver, a fuel consumption after the maneuver, and a fuel consumption for reversing the maneuver, wherein the fuel consumption after the maneuver is evaluated based on an estimated duration before reversing the maneuver.

9. The apparatus of claim 1, wherein the maneuver is a decrease of an inter-vehicle distance between the transportation vehicles of the platoon, wherein the apparatus receives information related to PQoS, and wherein the control module is further configured to predict, based on the information related to the PQoS, a duration of a decreased inter-vehicle distance until the inter-vehicle distance must be increased, and further configured to determine the reference point based on the fuel consumption for decreasing the inter-vehicle distance, on maneuvering duration requirements, and on the fuel consumption for the predicted duration of decreased inter-vehicle distance within the platoon.

10. The apparatus of claim 1, wherein an overall fuel consumption of the transportation vehicles of the platoon for the maneuver is evaluated, between the maneuver and a reverse maneuver, wherein the maneuver is rejected in response to the overall fuel consumption being higher with the maneuver than without the maneuver.

11. The apparatus of claim 1, wherein a maneuver duration is determined, and wherein information related to the maneuver duration is provided together with the information related to the reference point.

12. The apparatus of claim 1, wherein a control parameter for the maneuver is determined, the control parameter setting a pace at which the maneuver is carried out, wherein information related to the control parameter is provided together with the information related to the reference point and/or together with information related to a subsequent control strategy comprising kinematic information.

13. The apparatus of claim 1, wherein information related to the reference point and the maneuver is communicated to one or more transportation vehicles of the platoon.

14. A method for controlling a maneuver within a platoon of a plurality of transportation vehicles, the method comprising:
receiving information related to the maneuver for the platoon, wherein the maneuver includes increasing or decreasing an inter-vehicular distance between the transportation vehicles of the platoon such that, upon the maneuver being completed, the inter-vehicular distance between the transportation vehicles of the platoon is a same predefined inter-vehicular distance;
selecting a plurality of reference point transportation vehicles from among the plurality of transportation vehicles,
for each one of the plurality of reference point transportation vehicles, determining corresponding values of one or more criteria parameters for achieving the same predefined inter-vehicular distance by maneuvering at least one of the plurality of transportation vehicles within the platoon with respect to the one of the plurality of reference point transportation vehicles;
identifying an optimized reference point transportation vehicle based on the corresponding values; and
providing information to at least one transportation vehicle of the plurality of transportation vehicles indicating the identified optimized reference point transportation vehicle.

15. The method of claim 14, wherein the one or more maneuver criteria comprise one or more elements of the group of a fuel consumption of the transportation vehicles of the platoon without the maneuver, a fuel consumption of the transportation vehicles of the platoon for the maneuver, a fuel consumption of the transportation vehicles of the platoon after the maneuver, a time consumption of the transportation vehicles of the platoon for the maneuver, an estimated time till the next maneuver, and a time consumption of the transportation vehicles of the platoon for a reverse maneuver.

16. The method of claim 14, further comprising receiving information related to a predicted quality of service (PQoS) of communication links between the transportation vehicles of the platoon.

17. The method of claim 14, further comprising determining an economic efficiency of the maneuver.

18. The method of claim 17, wherein the maneuver is a decrease of an inter-vehicle distance between the transportation vehicles of the platoon, wherein the determining of the economic efficiency comprises evaluating a fuel consumption for the maneuver, a fuel consumption after the maneuver, and a fuel consumption for reversing the maneuver, wherein the fuel consumption after the maneuver is evaluated based on an estimated duration before reversing the maneuver.

19. The method of claim 14, wherein the maneuver is a decrease of an inter-vehicle distance between the transportation vehicles of the platoon, wherein the method comprises receiving information related to PQoS, and wherein the method comprises predicting, based on the information related to the PQoS, a duration of a decreased inter-vehicle distance until the inter-vehicle distance must be increased, and wherein the method comprises determining the reference point based on the fuel consumption for decreasing the inter-vehicle distance, on maneuvering duration requirements, and on the fuel consumption for the predicted duration of decreased inter-vehicle distance within the platoon.

20. The method of claim 14, further comprising evaluating an overall fuel consumption of the transportation vehicles of the platoon for the maneuver, between the maneuver and a reverse maneuver, wherein the method further comprises rejecting the maneuver in response to the overall fuel consumption being higher with the maneuver than without the maneuver.

21. The method of claim 14, further comprising determining a maneuver duration, and wherein information related to the maneuver duration is provided together with the information related to the reference point.

22. The method of claim 14, further comprising determining a control parameter for the maneuver, the control parameter setting a pace at which the maneuver is carried out, wherein information related to the control parameter is provided together with the information related to the reference point and/or together with information related to a subsequent control strategy comprising kinematic information.

23. The method of claim 14, further comprising communicating information related to the reference point and the maneuver to one or more transportation vehicles of the platoon.

* * * * *